United States Patent [19]

Dominguez Montes

[11] Patent Number: 5,459,537
[45] Date of Patent: Oct. 17, 1995

[54] PROCESS FOR THE REPRODUCTION OF THREE-DIMENSIONAL IMAGES

[76] Inventor: Juan Dominguez Montes, Comunidad de Canarias No. 68, Las Rozas, Madrid, Spain

[21] Appl. No.: 204,259

[22] Filed: Mar. 7, 1994

[51] Int. Cl.[6] .................................................. G03B 21/28
[52] U.S. Cl. .............................. 353/7; 359/462; 352/58
[58] Field of Search .................................. 353/7, 10, 122; 359/471, 472, 477, 479; 352/57, 58, 60, 59

[56] References Cited

U.S. PATENT DOCUMENTS

| | | | |
|---|---|---|---|
| 4,740,073 | 4/1988 | Meacham | 352/58 |
| 4,957,361 | 9/1990 | Shaw | 352/59 |
| 5,237,353 | 8/1993 | Montes | 352/58 |
| 5,302,989 | 4/1994 | Taguchi et al. | 352/58 |

FOREIGN PATENT DOCUMENTS 9201241  1/1992  WIPO.

*Primary Examiner*—William A. Cuchlinski, Jr.
*Assistant Examiner*—William Dowling
*Attorney, Agent, or Firm*—Ladas & Parry

[57] ABSTRACT

Process for the reproduction of three-dimensional static or moving images, in which the stills, in number greater than three, are positioned on a single film, projection is carried out in groups of stills which are projected through a single optical projection system, the optical path taken by the rays from the central still of each of these groups is not split by any lateral reflection, the remainder of the light rays from the remainder of the stills undergoes as many lateral reflections as indicated by the number of its position with respect to the central still, the stills on the film with an odd number of reflections being specularly inverted with respect to the stills which occupy even sites and the central one.

6 Claims, 7 Drawing Sheets

PROCESS FOR THE REPRODUCTION OF THREE-DIMENSIONAL IMAGES

The present invention relates to a process for the reproduction of three-dimensional static and/or moving images. A three-dimensional projector of small volume and low weight may thereby be produced, suitable for advertisements, slides, domestic usage, shop windows, conference rooms and other similar exhibition sites.

BACKGROUND OF THE INVENTION

Systems based on the angular differentiation of images require the capture, from separate sites, of a large number of images and the projection, from different locations, of the same number of images.

In the U.S. Pat. No. 1,833,290 by Ives, three systems of reproduction by projection are described which are valid for static or moving images.

Of these three systems, that of back projection with a single projection objective is not suitable for three-dimensional reproduction based on the angular differentiation of images.

By contrast, the two other front projection systems may be valid.

In one of them as many projectors and films are used as images, in the other a single film is employed with a projector having as many objectives as images, the objectives being the same distance apart as would occur in the case of independent projectors.

The disadvantage of both systems stems from the large volume occupied by the reproduction elements of the device, as well as from the enormous length of the film and of the projector(s) when the number of images is high.

The Applicant has been granted patent application Ser. No. 90/00024.

In this Patent Application are described and claimed various aspects of the relevant optical systems for producing three-dimensional reproductions based on the angular differentiation of images. Claimed in particular is a process and the corresponding projector for reproducing three-dimensional images, in which a number of objectives equal to one third the number of images is used. Each objective projects three images. Each trio of images is located on a single film with a distance between trios which does not always correspond with the breadth of the trio. The stills projected by each objective are located on the film at various heights.

SUMMARY OF THE INVENTION

The Applicant, in view of this background information and in a desire to obtain the maximum efficiency from his system for three-dimensional reproduction, especially in order to obtain a larger angle of vision, has developed a system in which a projector of modest volume is used having a very small number of objectives in relation to the number of images.

Firstly, it has been sought to extend the optical path within a restricted space, for which purpose several front reflections (in particular 2 or 3) have been applied in the path running between the optical projection objectives and the optical reproduction system. Since this strategy is known per se, it is not claimed in the present instance.

The present invention is based on the principle that with a very small number of projection objectives (for example 8) a very large number of images (for example 40) is projected onto the optical reproduction system (screen), these images being located like stills one after another, with no intermediate space, on a single film, producing optically the same effect as if the images (for example 40 in number) were projected from distinct, separated sites.

Each objective projects an odd number (greater than three) of images (in the preferred case 5).

The central image will be projected in the customary manner, either directly or through split front projections.

In the film from which projection is carried out, the images in an odd number (greater than three), corresponding to each objective, exhibit the following characteristics:

the central image is in the right-hand specular position;

the lateral images at an odd distance with respect to the central image are in the inverted specular position with respect to this central image;

the lateral images which occupy an even site with respect to the central image are in the same right-hand specular position as the aforesaid central image. The projector used, apart from being employed in increasing the path by front reflections, is of entirely similar construction to the projector of the aforesaid application Ser. No. 90/00024.

On being projected, the central image of each group will not undergo any lateral reflection. The images located at odd sites with respect to this central image will undergo an odd number of reflections, whilst those located at even sites with respect to this same central image will undergo an even number of reflections.

The invention will be defined below with the help of the attached figures in which:

FIGS. 1 to 3 explain the increase in the length of the optical path, in particular of a system with two front reflections in FIG. 1 and two forms of a system with three front reflections in FIGS. 2 and 3;

in the remaining FIGS. 4, 5, 6 and 7, for clarity a restricted number only, 40, of images has been represented;

in FIG. 4 are shown the optical paths followed by the projection beam of the 20 images on the left;

in FIG. 5 are shown the optical paths followed by the projection beams of the 20 images on the right and, finally in FIG. 6 are shown the optical paths followed by the projection beams of the total of the 40 images;

in FIG. 7 is shown the order of the 40 stills on a single film, the stills belonging to the same objective appear in the same box and the relative specular position of one still with respect to another is indicated by the direction of the arrow located in the lower part of each still.

DETAILED DESCRIPTION OF THE INVENTION

Figure 1:
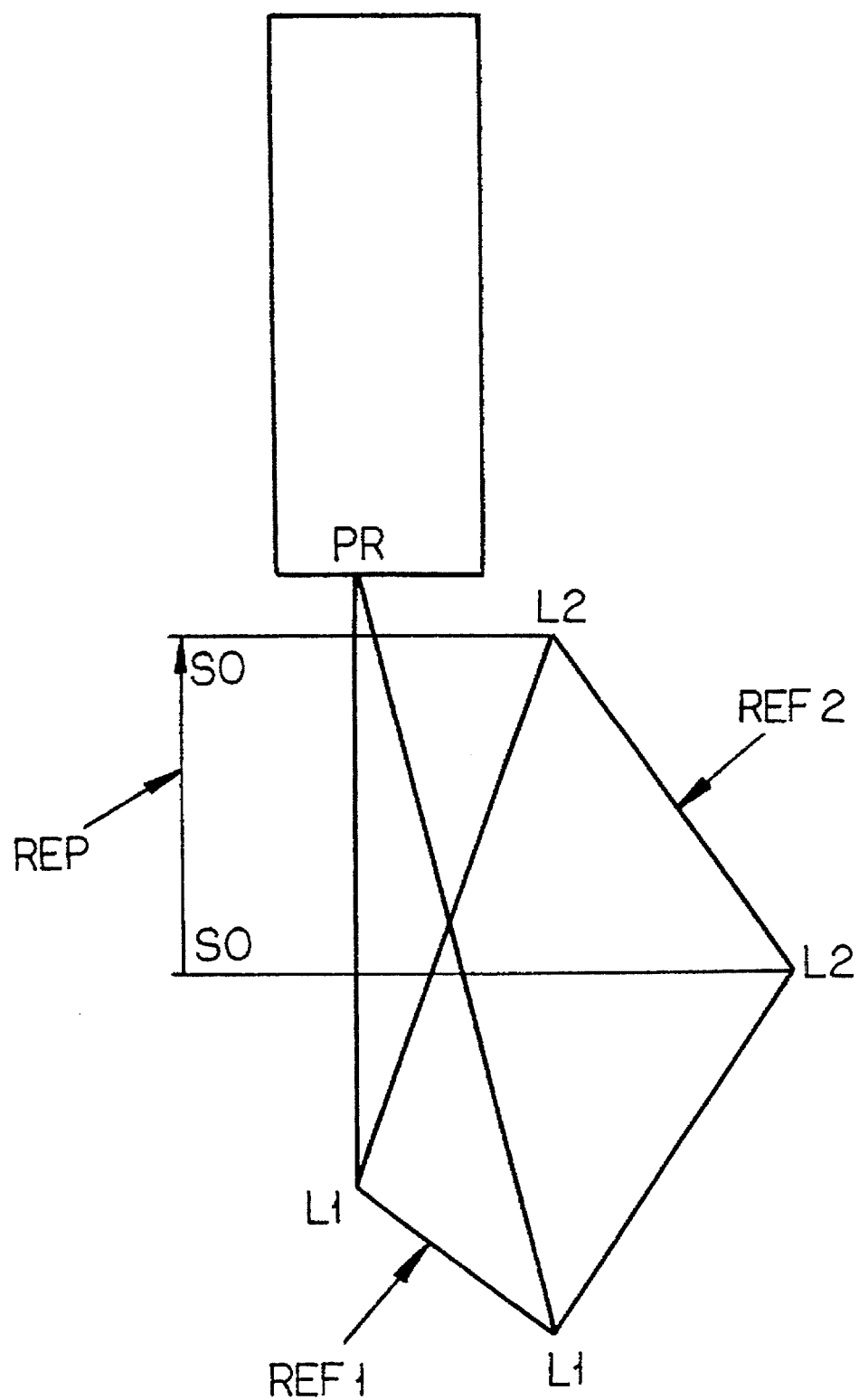

Shown in FIG. 1 is a process for back projection which produces a long optical path in a small volume using two front reflections, the first on the plane specular surface L1L1 and the second on the plane specular surface L2L2. The optical reproduction system appears with the label SOSO.

Figure 2:
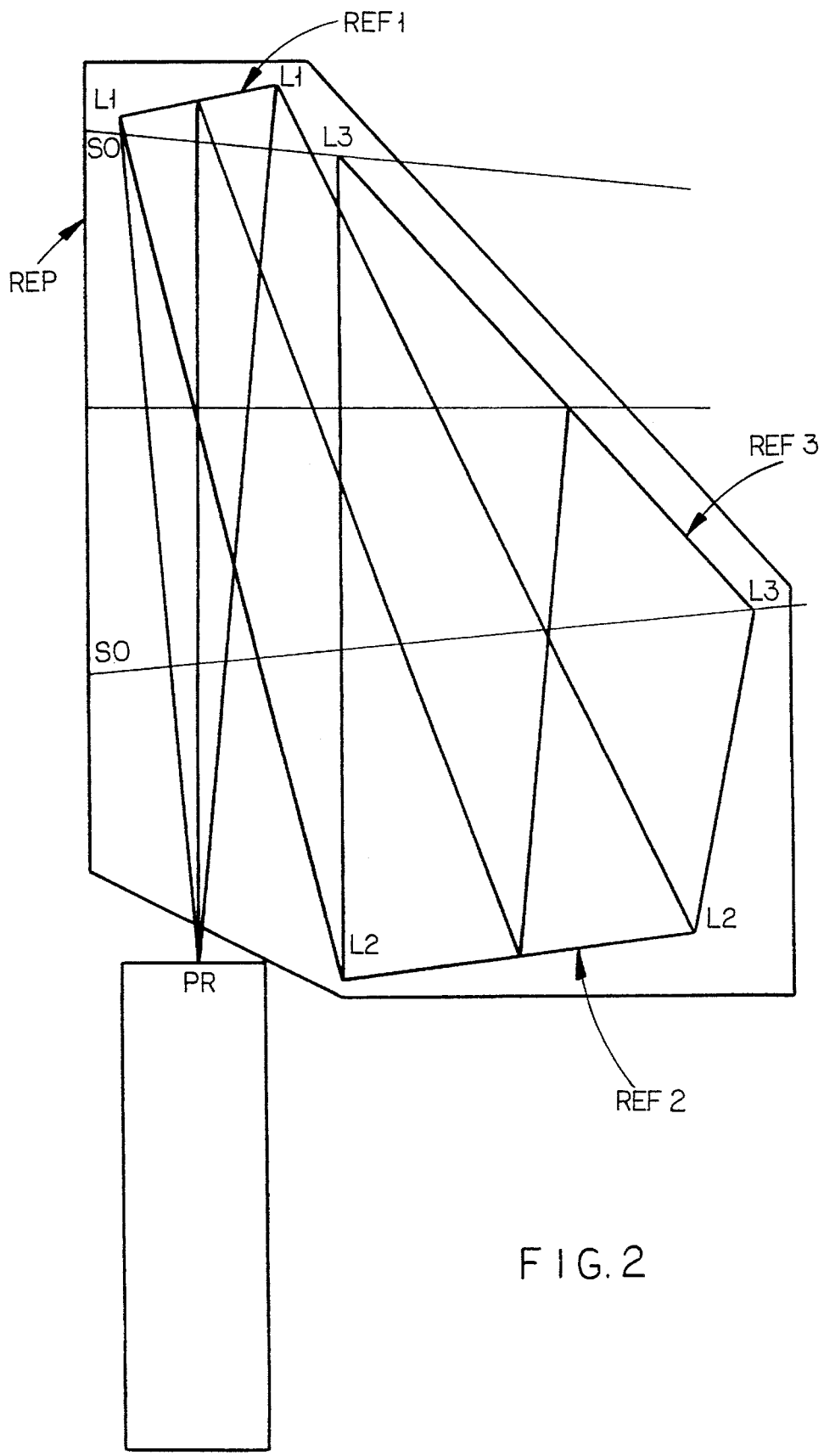

Shown in FIG. 2 is a process for back projection which produces a long optical path in a restricted space using three front reflections on the plane surfaces L1L1, L2L2 and L3L3. The optical reproduction system is labelled SOSO in the figure.

Figure 3:
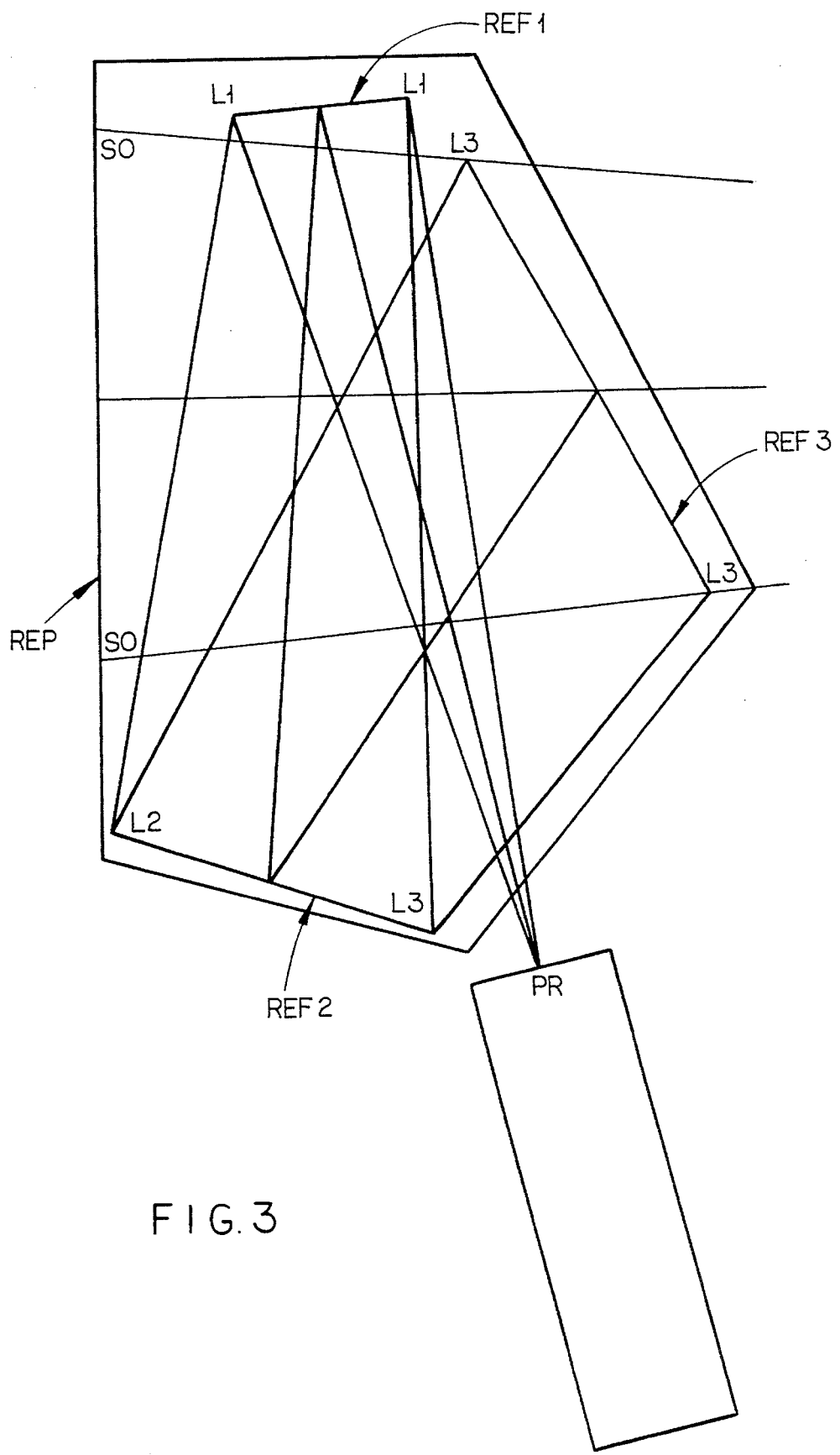

Shown in FIG. 3 is another form different to that shown in FIG. 2, of three front reflections.

In the remaining figures, for simplicity only the case of 40 images and 8 objectives, that is to say 5 images per objective, will be represented. Generalization to the case of N images, N/u objectives and u images per objective is obvious.

Figure 4:
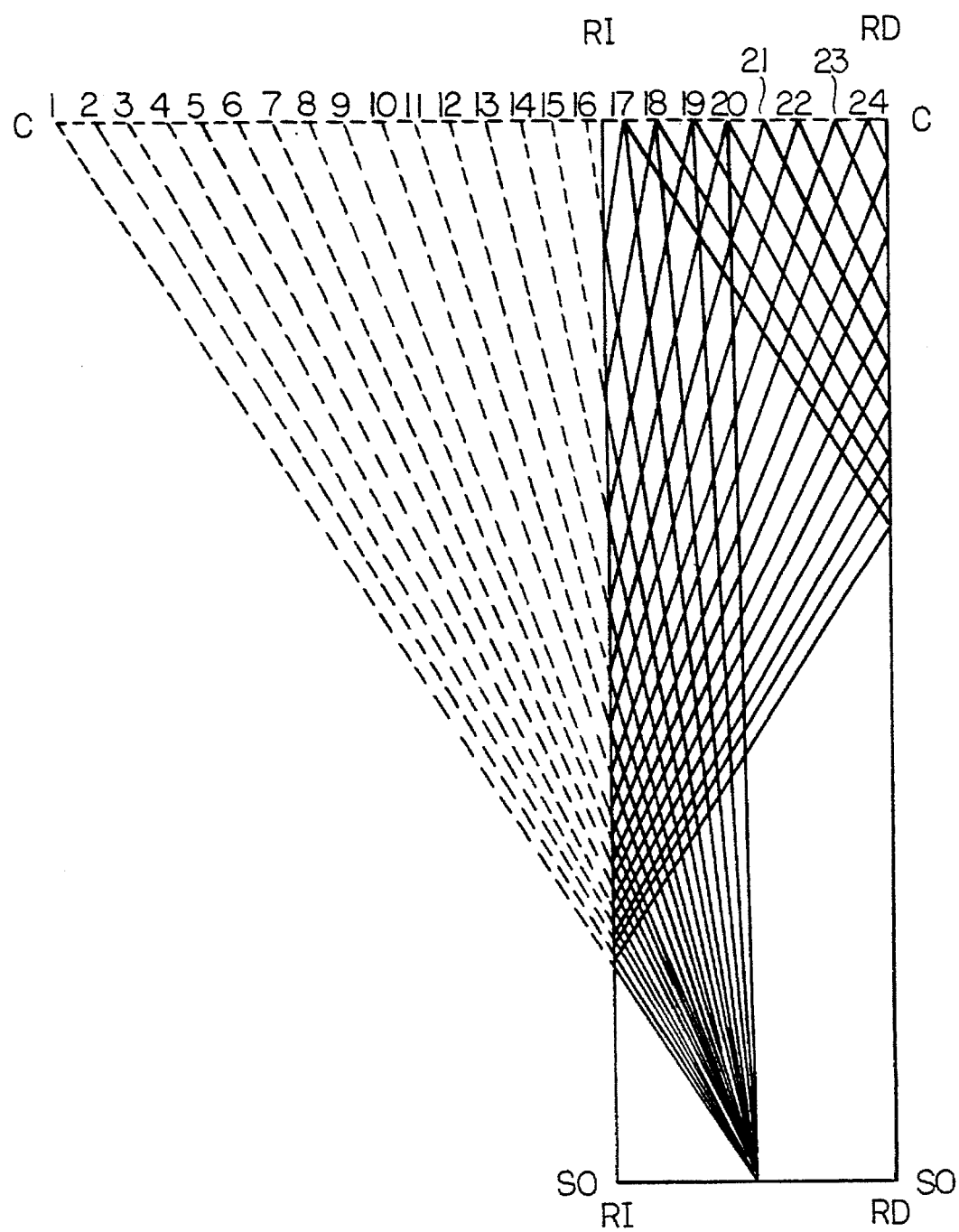

Shown in FIG. 4 are the optical paths followed by the projection beams of the 20 left-hand images numbered in the figure with numbers 1 to 20.

As may be seen in this figure, the images corresponding to the numbers 17, 18, 19 and 20 take an optical path without lateral reflections, the rays represented travel directly from the optical centres of the real projection objectives 17, 18, 19, 20, 21, 22, 23, 24 from the line CC to the centre of the optical reproduction system SOSO.

The images 9, 10, 11, 12, 13, 14, 15 and 16 undergo a single left lateral reflection on travelling from the optical centres of the objectives labelled 17, 18, 19, 20, 21, 22, 23 and 24 of the line CC to the centre of the optical reproducing element SOSO.

The images labelled with the numbers 1, 2, 3, 4, 5, 6, 7, and 8 undergo two reflections on travelling from the projection objectives to the centre of the optical reproduction system SOSO. The first reflection at the right lateral plane specular surface RDRD and the second at the left lateral plane specular surface RIRI.

The resulting optical effect is the same as would be produced supposing 20 mutually equidistant projection objectives, one for each image, located at the points 1, 2, 3, ... 19 and 20 of the line CC.

Figure 5:
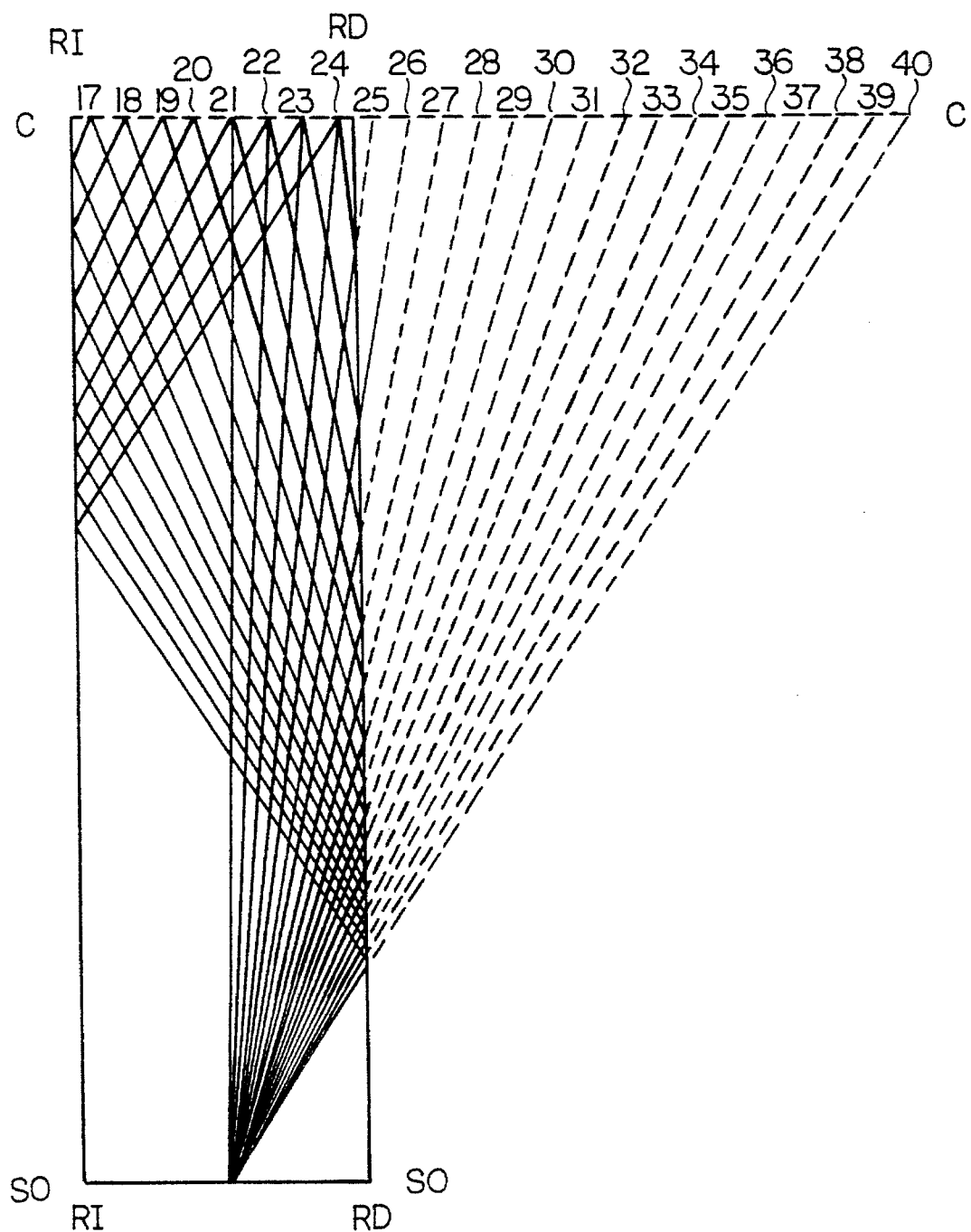

FIG. 5 shows the optical paths followed by the projection beams of the 20 images on the right, that is to say from 21 to 40.

As can be seen in this FIG. 5, the optical paths taken by the projection beams of the images 21, 22, 23 and 24 undergo no lateral reflection. The rays travel directly from the projection objectives whose optical centres lie at the points 17, 18, 19, 20, 21, 22, 23 and 24 of the line CC and the centre of the optical reproduction system SOSO. The images labelled with the numbers 25, 26, 27, 28, 29, 30, 31 and 32 undergo a right lateral reflection on travelling from the optical centres of the projection objectives 17, 18, 19, 20, 21, 22, 23 and 24 on the line CC to the centre of the optical reproduction system SOSO. The images labelled with the numbers 33, 34, 35, 36, 37, 38, 39 and 40 undergo two reflections on travelling from the optical centres of the projection objectives to the centre of the optical reproduction system. The first reflection at the left lateral plane specular surface RIRI and the second at the right lateral plane specular surface RDRD.

Figure 6:
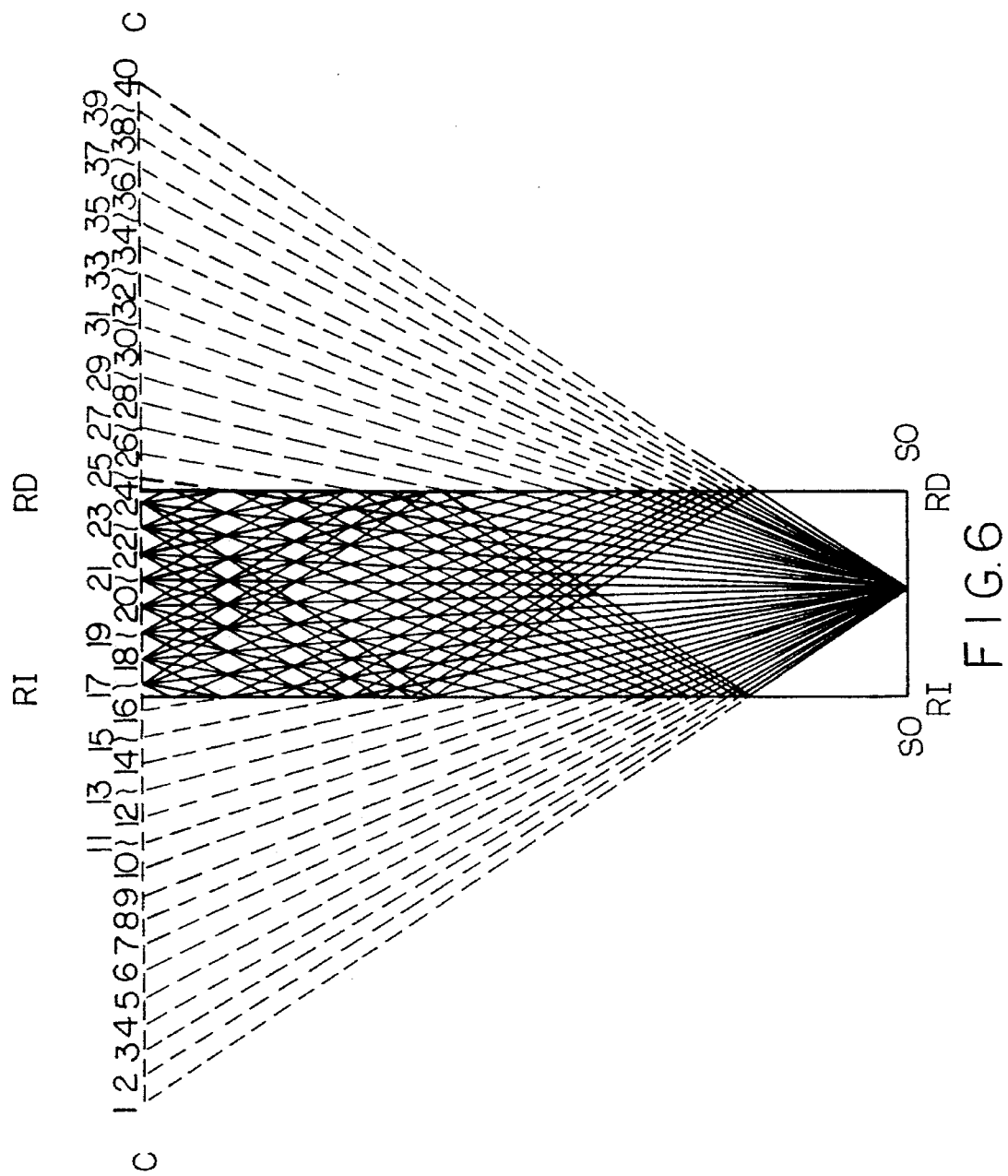

The total resulting optical effect is obtained on superimposing FIGS. 4 and 5 as can be seen in FIG. 6 and is the same as would be produced supposing the 40 centres of the projection objectives to be mutually equidistant, one for each image and located at the points 1, 2, 3, ... , 40 of the line CC.

Figure 7:
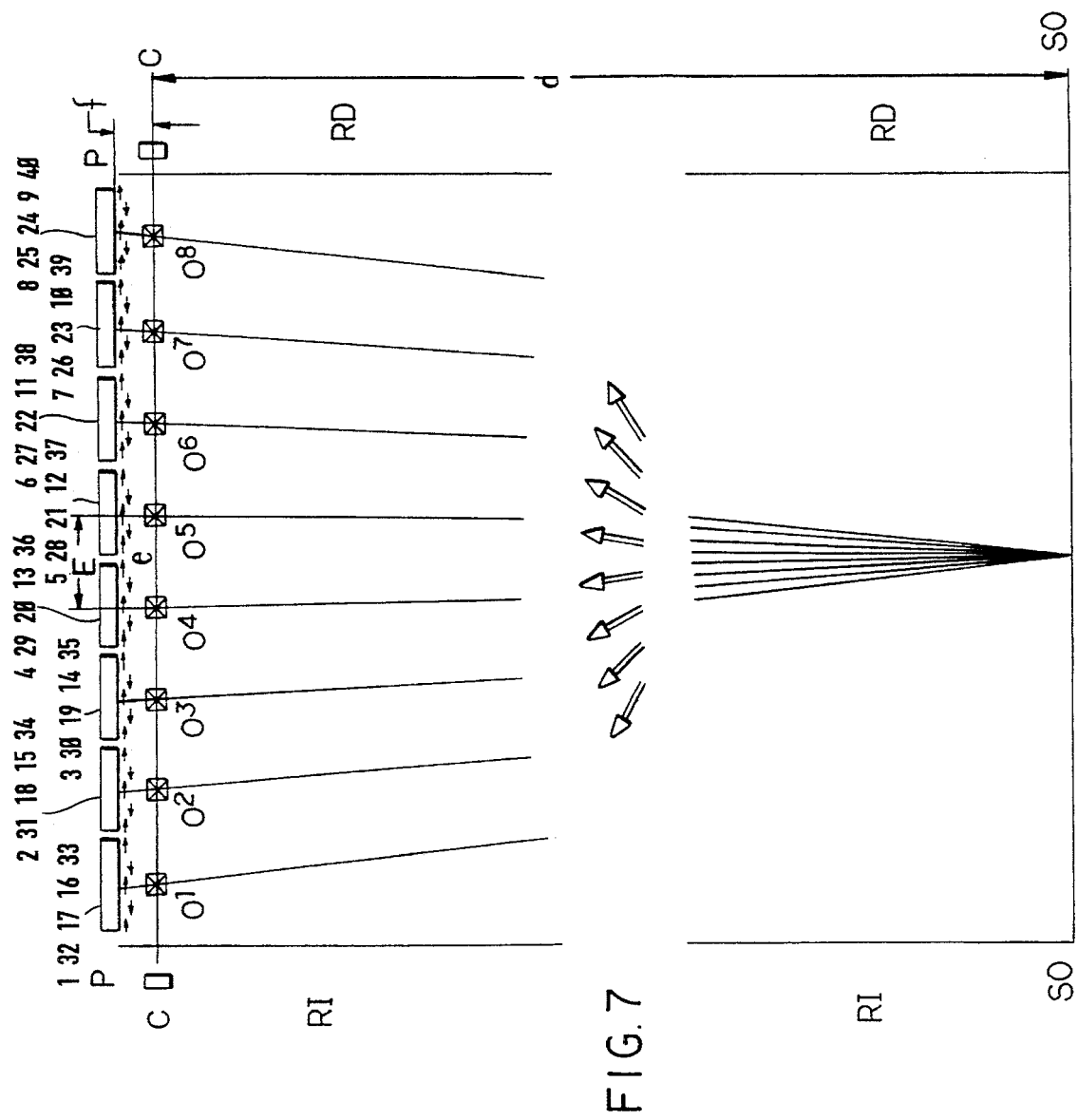

FIG. 7 shows the arrangement of the 40 stills on the line PP parallel to the line CC joining the optical centres of the projection objectives 01, 02, ... , 08 which lies a distance f from the abovementioned PP for the purpose of focusing the images in the plane containing the optical reproduction system SOSO, which will be parallel to the abovementioned lines CC and PP. The left and right plane specular surfaces are shown in the drawing by the lines RIRI for the left and RDRD for the right. The distance between two central stills corresponding to groups of stills from two contiguous objectives is labelled E. The width of each still q and the number of stills captured per objective u. In this way the distance E between two central stills will equal:

$$E = u \cdot q$$

u being the number of stills projected by each objective and q the width of each still.

In the particular case shown in the figures in which u=5, it will be:

$$E = 5 \cdot q$$

The distance between the optical centres of the projector objectives is denoted e in the figure. If S is the size of the optical reproducing system and N the total number of images, it will follow that:

$$S = \frac{N}{u} e$$

Furthermore, if f denotes the distance between the optical centre of the projection objective and the film and d the distance between these same centres and the optical reproduction system:

$$\frac{E}{e} = \frac{d+f}{d} = 1 + \frac{f}{d} = 1 + \frac{q}{S}$$

Given that E=uq and S=(N/u)e, it also follows that:

$$E/e = (q/S)N = 1 + q/S$$

or else $$q/S(N-1) = 1$$

and hence:

$$S = (N-1)q$$

which expresses the size S of the optical system as a function of the number N of stills and of the width q of the latter.

For the particular case shown in FIGS. 4, 5 and 6, N=40 in which $$S = 39q$$

Similarly, if F denotes the focal distance of the projection objective and d the distance of projection, the following relations will hold:

$$d/f = S/q = N-1$$

$$1/f + 1/d = 1/F$$

and the focusing distance f as a function of the focal distance F will be given by:

$$f = \frac{N}{N-1} F$$

Similarly, the distance of projection d as a function of the focal distance F will be given by:

$$d = NF$$

Which, in the particular case of FIGS. 4, 5 and 6 in which N=40

$$f = (40/39)F$$

and $$d = 40F$$

Choosing the so-called 35 mm cinematographic format, the width of which will equal q=18 mm, results in an optical projection system width S of:

$$S = 72 \text{ cm}$$

A distance between projector objectives e of:

$$e = 72/8 = 9 \text{ cm}$$

Choosing a value of 70 mm for F the focal distance of the projection objectives, the resulting distance of the projection will be:

$$d = 280 \text{ cm}$$

Values which would serve for the design of a realizable three-dimensional optical reproduction system.

Further to the explanation already given of the drawings, written out below is the meaning of some of the symbols which appear in FIGS. 1 to 3 and which were not mentioned explicitly in the foregoing:

REF1—Reflector 1
REF2—Reflector 2
REF3—Reflector 3
REP—Reproducing unit
PR—Projector Although the invention has been described with reference to a preferred embodiment, it will be understood that it will be possible to modify the details of the latter without however departing from the sphere of the invention. Nevertheless, the scope of the latter shall remain defined solely by the content of the claim which follows.

I claim:

1. A process for reproducing a static three-dimensional image which occupies a volume of small dimensions owing to the use of several front reflections interposed in optical paths taken by light rays from projection objectives to an optical reproduction system, the process being characterized in that more than three stills are positioned on a single film one next to another at the same height and projection is carried out from a group of the stills, the group consisting of an odd number of more than three of the stills, the projection being through a single optical projection system to an optical reproduction system, an optical path taken by light rays of the projection from a central one of the stills of the group not being split by any lateral reflection and optical paths of all other light rays of the projection from each other one of the stills of the group respectively undergoing as many lateral reflections as indicated by a number of a position of the one of the stills with respect to the central one of the stills, the stills with an odd number of the lateral reflections being specularly inverted in the projection with respect to the stills with an even number of the lateral reflections and the central one of the stills, the optical paths being split up by sufficient front reflections as necessary for a selected volume.

2. The process according to claim 1, wherein the stills are positioned on the film one next to another with intermediate spaces therebetween.

3. The process according to claim 1, wherein the stills are positioned on the film one next to another without intermediate spaces therebetween.

4. A process for reproducing moving three-dimensional images which occupies a volume of small dimensions owing to the use of several front reflections interposed in optical paths taken by light rays which travel from projecting objectives to an optical reproduction system, the process being characterized in that more than three stills are positioned on a single film one next to another at the same height and projection is carried out from successive groups of the stills, each of the groups consisting of an odd number of more than three of the stills, the stills in each of the groups being different from the stills in any other of the groups, the projection being through a single optical projection system to an optical reproduction system, an optical path taken by light rays of the projection from a central one of the stills of each one of the groups not being split by any lateral reflection and optical paths of all other light rays of the projection from each other one of the stills of the one of the groups respectively undergoing as many lateral reflections as indicated by a number of a position of the one of the stills of the one of the groups with respect to the central one of the stills of the one of the groups, the stills thereof with an odd number of the lateral reflections being specularly inverted in the projection with respect to the stills with an even number of the lateral reflections and the central one of the stills, the optical paths being split up by sufficient front reflections as necessary for a selected volume.

5. The process according to claim 4, wherein the stills are positioned on the film one next to another with intermediate spaces therebetween.

6. The process according to claim 4, wherein the stills are positioned on the film one next to another without intermediate spaces therebetween.

* * * * *

UNITED STATES PATENT AND TRADEMARK OFFICE
CERTIFICATE OF CORRECTION

PATENT NO. : 5,459,537
DATED : October 17, 1995
INVENTOR(S) : Juan Dominguez Montes It is certified that error appears in the above-identified patent and that said Letters Patent is hereby corrected as shown below:

On the title page, left-hand column, insert -

-- [22] PCT Filed: Jul. 28, 1992 [86] PCT No.: PCT/ES92/00058

§ 371 Date: Mar. 7, 1994 § 102(e) Date: Mar. 7, 1994 [87]

PCT Pub. No.: WO94/02883 PCT Pub. Date: Feb. 3, 1994 --

Signed and Sealed this

Twelfth Day of March, 1996

Attest:

BRUCE LEHMAN

Attesting Officer       Commissioner of Patents and Trademarks